United States Patent Office 3,773,860
Patented Nov. 20, 1973

3,773,860
PHOSPHONOCARBOXYLIC ACID AMIDES
Hermann Nachbur, Dornach, and Arthur Maeder, Therwil, Switzerland, assignors to Ciba-Geigy AG, Basel, Switzerland
No Drawing. Filed Aug. 5, 1971, Ser. No. 169,493
Claims priority, application Switzerland, Aug. 7, 1970, 11,913/70
Int. Cl. C07f 9/40
U.S. Cl. 260—943
7 Claims

ABSTRACT OF THE DISCLOSURE

Phosphonocarboxylic acid amides of the formula

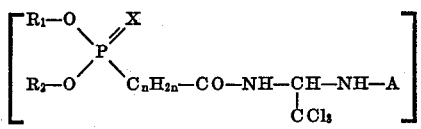

are provided, wherein $R_1$ and $R_2$ each denote an alkyl halogenoalkyl or alkenyl radical with at most 4 carbon atoms, A denotes an optionally further substituted aryl or alkyl radical, X denotes a sulphur or an oxygen atom and $n$ is an integer of 1 to 3. These compounds are useful for flameproofing of plastics or casting compositions which serve for the manufacture of shaped articles, such as foams, films or fibres.

---

The subject of the invention are phosphonocarboxylic acid amides of the formula (1) 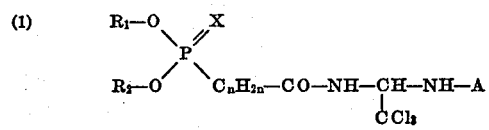

wherein $R_1$ and $R_2$ each denote an alkyl, halogenoalkyl or alkenyl radical with at most 4 carbon atoms, A denotes an aryl or alkyl radical which is optionally substituted further, X denotes a sulphur atom or preferably an oxygen atom and $n$ denotes an integer having a value of 1 to 3.

Phosphonocarboxylic acid amides of the formula (2) 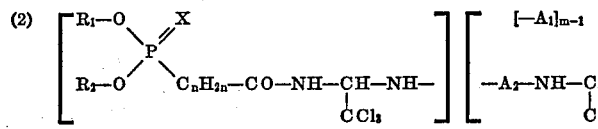

wherein $R_1$, $R_2$, X and $n$ having the indicated meaning, $A_1$ denotes a benzene radical which is optionally substituted by methyl, ethyl or chlorine, or denotes alkyl with at most 4 carbon atoms, $A_2$ denotes phenylene or diphenylmethane and $m$ denotes 1 or 2, are of particular interest.

Amongst these, the phosphonocarboxylic acid amides which correspond to the formula (3) 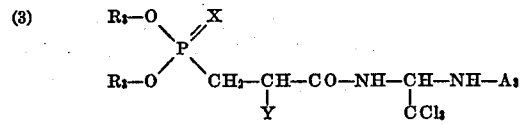

wherein $R_3$ denotes a methyl, ethyl, chloroethyl or allyl group, $A_3$ denotes a benzene radical, an alkyl group with at most 4 carbon atoms or a halogenoalkyl group with at most 4 carbon atoms and Y denotes a hydrogen atom or a methyl group, are preferred, $R_3$ here preferably represents a methyl or ethyl group, and Y represents a hydrogen atom.

The radical A, or $A_1$, $A_2$ or $A_3$ can be, for example, a naphthalene radical or benzene radical which is not substituted further, a benzene radical which contains one or more substituents, such as methyl groups, ethyl groups and/or chlorine atoms, a butyl, isopropyl, ethyl or methyl group, or a β-chloroethyl group. The aryl radical A can furthermore also represent a benzene radical or especially a diphenylmethane radical, which possesses, as substituents, a radical of the formula (4) 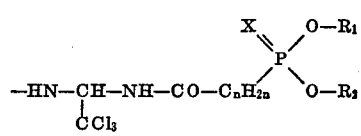

wherein $R_1$, $R_2$, X and $n$ have the indicated meaning. Particularly suitable phosphonocarboxylic acid amides are those which terminally at the —NH— group possess a benzene radical which is further substituted by an alkyl group such as methyl, or a halogen atom such as chlorine, or above all a benzene radical which is not substituted further, for example the phosphonocarboxylic acid amides of the formula (5) 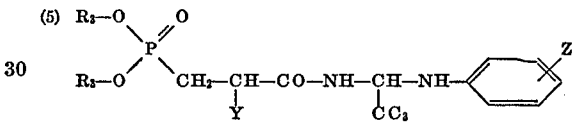

wherein $R_3$ has the indicated meaning and Z denotes as hydrogen atom, a chlorine atom or a methyl group.

The phosphonocarboxylic acid amides of the Formulae 1 to 3 and 5 can be obtained in a manner which is in itself known, from phosphonopropionic acid α-hydroxy-β,β,β-trichloroethylamides and isocyanates, in accordance with the equation.

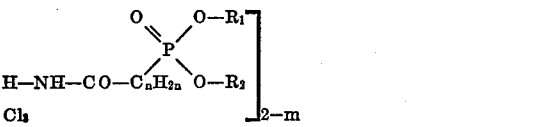

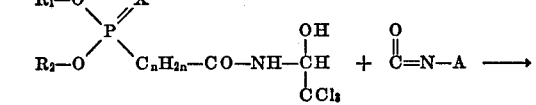

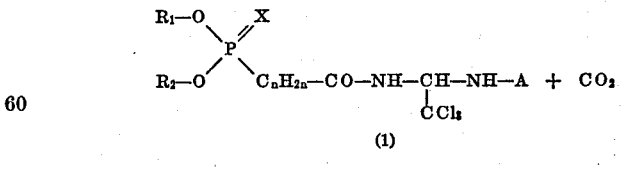

Here $R_1$, $R_2$ X and $n$ again have the indicated meaning. The reaction is appropriately carried out at moderately elevated temperature, in the presence of an inert solvent, such as dimethylformamide, and using at least approximately equivalent amounts of the two starting substances, optionally with the addition of a catalyst. Where compounds of the Formula 2, wherein $m$ is 1, are manufactured, about 1 mol of diisocyanate is, of course, reacted with about 2 mols of phosphonocarboxylic acid amide.

The compounds thus obtainable can in general be isolated easily by distilling off the solvent, and can be purified by recrystallisation.

The amides of the Formula 4 required as starting substances are obtained by reaction of acid amides, containing an unsubstituted acid amide group, with chloral hydrate:

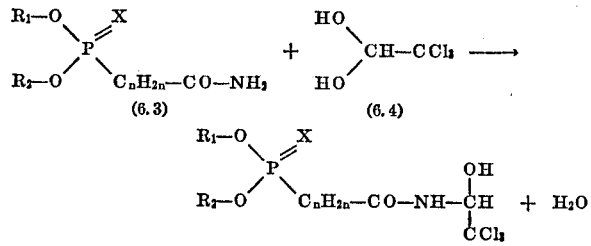

This reaction, again, is advantageously carried out at elevated temperature, for example 50 to 150° C., using equivalent amounts of the starting substances, and in the presence of an inert solvent. Possible inert solvents are, for example, aromatic hydrocarbons such as xylenes, toluene or especially benzene. Appropriately, the reaction is allowed to take place at 70 to 120° C., advantageously at the boiling point of the reaction mixture, and the water of reaction is removed continuously.

The phosphonocarboxylic acid amides of the Formulae 1, 2, 3 and 5 can be used as flameproofing agents. In this case they can, for example, be fixed from aqueous dispersion onto textile materials, for example cellulose fibres, with the aid of a so-called pigment fixing agent. They can also be used from organic solvents, such as dimethylformamide, trichloroethylene or perchloroethylene.

Preferably, however, they are incorporated into plastics or casting compositions which are to serve for the manufacture of shaped articles, such as foams, films or especially fibres. Regenerated cellulose, polyamides, polyesters, polyurethanes, polyalkylenes and polyacrylonitrile may be mentioned as examples of such compositions.

However, particularly advantageous results are obtained if phosphonocarboxylic acid amides of the Formula 1 are incorporated into viscose compositions which are then further processed into films or preferably into fibres. It is advisable first to convert the phosphonocarboxylic acid amides into aqueous dispersions of fine particle size by means of suitable surface-active agents, and to incorporate them in this form into the viscose composition. The content of phosphonocarboxylic acid amide, relative to pure cellulose, is preferably 20 to 50%, for example 25 to 40%.

The other preferred use is the use as a flameproofing agent for polyurethanes.

The compounds of the Formula 1 are appropriately incorporated into the polyurethane foams or polyurethane coatings by adding them to the mixture used for the manufacture of the foams or to the coating compositions.

These manufacturing mixtures have the usual composition for the manufacture of polyurethane foam. As a rule, they contain polyethers with free hydroxy groups, for example polyols, and diisocyanates such as, for example, 4,4'-diphenylmethane-diisocyanate or toluylenediisocyanate as the reactants. As blowing agents required for the formation of the foam, the mixtures contain, for example, fluorotrichloromethane or difluorodichloromethane. As an activating additive, the mixtures can additionally contain a tertiary amine such as, for example triethylamine.

The use of 1 to 15%, preferably 10%, of the phosphorus-containing flameproofing component, relative to the solids content of the reaction mixtures for the manufacture of the polyurethane foam, is appropriate.

The phosphorus compounds incorporated into the polyurethane foams result in extremely flameproof foams.

Furthermore, additions of such phosphorus compounds do not interfere with the process of manufacture of the foams.

Admittedly, the present phosphorus compounds in part activate the course of the reaction of polyurethane formation, but this influence can be controlled by appropriate metering of the blowing agents and of the activator additives. The mechanical properties are also not affected by the addition of the phosphorus compounds, in that practically no distortion occurs.

The process can be used for flameproofing both so-called rigid and soft polyurethane foams. However, the process is preferably employed for flameproofing polyurethane coatings on substrates containing fibres.

In the examples which follow, parts are parts by weight and percentages are percentages by weight. The relationship of parts by weight to parts by volume is as of g. to ml.

EXAMPLE 1

164 parts (0.5 mol) of dimethylphosphonopropionic acid α-hydroxy-β,β,β-trichloroethylamide in 164 parts of dimethylformamide are warmed in a stirred flask of 500 parts by volume capacity, equipped with a reflux condenser and thermometer, to 68° C. internal temperature so as to give a clear solution. Thereafter 59.5 parts (0.5 mol) of phenylisocyanate are run in dropwise over the course of 10 minutes at the same temperature. After completion of the dropwise addition the mixture gradually starts to react, in the course of which the temperature rises as far as 90° C. over the course of 15 minutes and thereafter slowly drops again to about 70° C. The mixture is stirred for a further 12 hours at this temperature and the dimethylformamide is subsequently removed in vacuo (boiling point $_{11}$ 44–47° C.). 158 parts of dimethylformamide are recovered. The reaction product which remains is poured out into a porcelain dish and after having solidified completely is comminuted and recrystallised from 750 parts of a solvent mixture consisting of 500 parts of benzene and 250 parts of petroleum ether of boiling point 50 to 70° C.

135 parts of a white, powdery substance of melting point 117 to 119° C. are obtained; its elementary analysis and mass spectrum correspond to the formula

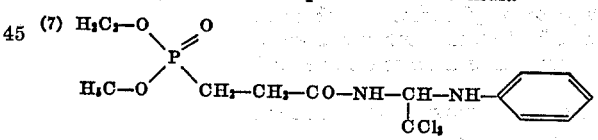

The dimethylphosphonopropionic acid α-hydroxy-β,β,β-trichloroethylamide which serves as the starting substance can be manufactured as follows:

90.5 parts (0.5 mol) of 3 - (dimethylphosphono)-propionic acid amide and 82.75 parts (0.5 mol) of chloral hydrate are suspended in 175 parts of benzene in a stirred flask of 500 parts by volume capacity, equipped with a water separator and reflux condenser as well as with a thermometer, and are heated to the boiling point of the benzene. Over the course of 3 hours, 10 parts of water, originating from the chloral hydrate, are collected in the water separator. After completion of the separation of water, the mixture is treated for a further 15 hours at the reflux temperature. After cooling, the crystalline reaction product which has precipitated is filtered off, rinsed with a little ether and dried.

EXAMPLE 2

65.5 parts (0.2 mol) of dimethylphosphonopropionic acid α - hydroxy - β,β,β - trichloroethylamide are dissolved in 350 parts by volume of acetonitrile at room temperature, in a stirred flask of 750 parts by volume capacity equipped with a reflux condenser, thermometer and dropping funnel. A solution of 27.1 parts (0.228 mol) of phenylisocyanate, dissolved in 50 parts by volume of acetonitrile, is added dropwise thereto over the course of 5 to 6 minutes. The temperature is 17° C. After adding 1 part by volume of triethylamine, the temperature rises as far as 27° C. Finally, the mixture is stirred for a further 30 minutes at 40° C., then cooled to room temperature and stirred for a further hour. The cloudy reaction solution is clarified by filtration and freed of acetonitrile in vacuo at 60° C. 84.5 parts of a crude product of coarse particle size are obtained, and this material is powdered and twice washed with ether.

Yield: 78.5 parts (97% of theory);
Melting point: 114–117° C.

The product corresponds to the Formula 7.

EXAMPLE 3

The procedure described in Example 2 is followed, except that the phenylisocyanate is replaced by 13.0 parts (0.228 mol) of methylisocyanate. After removal of the acetonitrile, 73 parts of a yellow viscous syrup are obtained and are dissolved in 300 parts by volume of water at room temperature. After a short time, a white precipitate forms, which is filtered off. After drying at room temperature, 22 parts of crude product (fraction I) are obtained. The aqueous filtrate is evaporated in vacuo at 60° C., whereupon a further 45 parts of crude product (fraction II) are obtained. The two fractions are combined and dissolved, with warming, in 100 parts by the volume of benzene, and 10 parts by volume of ether are added, whereupon crystallisation occurs on stirring and cooling in ice. A further 100 parts by volume of ether are added and the suspension is filtered. The filter residue is dried in vacuo at room temperature.

Yield: 61.5 parts (90% of theory) of white powder;
Melting point: 79–81° C.

The elementary analysis and the mass spectrum indicate the formula

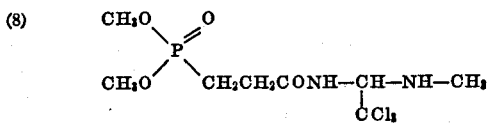

(8)

EXAMPLE 4

The procedure described in Example 2 is followed, except that instead of the "dimethylphosphonoamide" 70.9 parts (0.2 mol) of di - 2 - chloroethylphosphonopropionic acid α-hydroxy-β,β,β-trichloroethylamide are used.

After removal of the acetonitrile, 89 parts of a solid, yellowish mass are obtained. This is dissolved in 150 parts of methanol at room temperature and slowly treated with 500 parts by volume of water, whilst stirring vigorously. The precipitate is filtered off and dried in vacuo at 60° C.

Crude yield: 77 parts of yellowish white powder;
Melting point: 110–115° C.

After recrystallisation from 110 parts of isopropyl alcohol, 54 parts of white powder, melting point 119–121° C., are obtained; according to elementary analysis and mass spectrum, this material corresponds to the following formula:

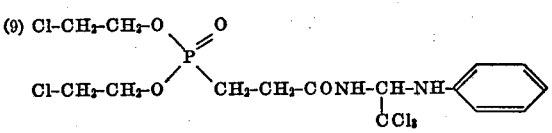

(9)

EXAMPLE 5

The procedure described in Example 2 is followed, except that instead of the phenylisocyanate 35.0 parts (0.228 mol) of m-chlorophenylisocyanate are used.

After completion of the reaction, the insoluble material is filtered off and the filtrate is freed of acetonitrile in vacuo at 60° C. 55 parts of a waxy product are obtained and are recrystallised from 100 parts of benzene.

Yield: 41 parts of white powder;
Melting point: 118–128° C.

According to the N, Cl and P analysis, the product corresponds to the formula

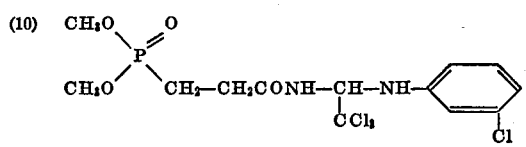

(10)

EXAMPLE 6

The procedure described in Example 2 is followed, except that instead of the "dimethylphosphonoamide" 71.3 parts (0.2 mol) of 3-diethylphosphonopropionic acid α-hydroxy-β,β,β-trichloroethylamide are used.

After completion of the reaction, the insoluble material is filtered off and the filtrate is freed of acetonitrile in vacuo at 60° C. 54.5 parts of a white powder (melting point 151–152° C.), which is already very pure, are obtained. Elementary analysis indicates the formula

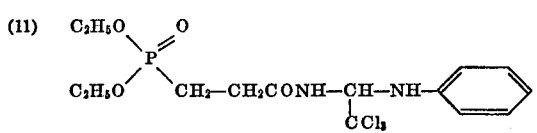

(11)

EXAMPLE 7

The procedure described in Example 2 is followed, except that instead of the "dimethylphosphonoamide" 76.1 parts (0.2 mol) of 3-dialkylphosphonopropionic acid α-hydroxy-β,β,β-trichloroethylamide are used.

After completion of the reaction the insoluble material is filtered off and the filtrate is freed of acetonitrile in vacuo at 60° C. 88 parts of a yellow, viscous product are obtained, which can be used without further purification.

The product corresponds to the formula

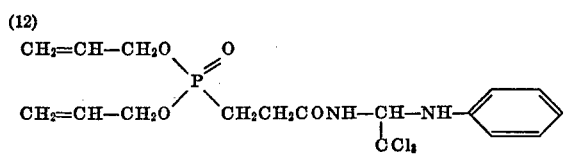

(12)

EXAMPLE 8

The procedure described in Example 2 is followed, except that the phenylisocyanate is replaced by 28.5 parts (0.114 mol) of 4,4'-diphenylmethane-diisocyanate of the formula

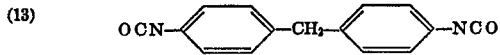

(13)

After completion of the reaction, the precipitate is filtered off and is dried in vacuo at 50° C.

Yield: 78 parts of yellowish powder;
Melting point: 167° C., with decomposition.

The crude product can be used without further purification.

N, P and Cl analysis indicates the formula (14)

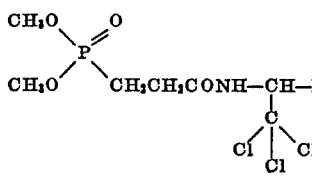 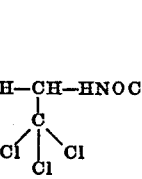

| | Sample without additive | Samples with addition of compound of the formula— | | |
|---|---|---|---|---|
| | | (8) | (9) | (10) |
| Burning time, seconds | (1) | 9 | 2 | 9 |
| Burning length, cm | (1) | 7 | 6 | 5.5 |
| Loss in weight, percent | 100 | 31 | 27 | 25 |
| Foam density, g./l | 39 | 39 | 40 | 40 |

1 Burns away.

EXAMPLE 9

26.5 parts of the dimethylphosphonopropionic acid α-phenylamino-β,β,β-trichloroethylamide of the Formula 7, obtained according to Example 1, 2.65 parts of a higher condensed reaction product of naphthalenesulphonic acid and formaldehyde and 70.85 parts of water are converted to a fine dispersion by grinding in the presence of glass balls at room temperature for 15 hours. This dispersion is incorporated into a viscose spinning composition, using a gear disc stirrer, in such a way that the content of carboxylic acid amide is 44.8% relative to cellulose. After spinning and further processing of the viscose, a textile material of very good flameproof character is obtained.

EXAMPLE 10

A mixture of 20 g. of a polyol which reacts slowly, 8 g. of fluorotrichloromethane, 21.4 g. of 4,4'-diphenylmethanediisocyanate, 0.2 ml. of an activator based on amine and 5 g. of the compound of the Formula 8, 9 or 10 is stirred for one minute with a simple blade stirrer at 1000 revolutions per minute. Thereafter the foaming mass is immediately introduced into a tube of 5.5 cm. diameter and the reaction is allowed to go to completion therein. At the same time a foam without the addition of compounds of the Formula 8, 9 or 10 is produced.

Test of flameproof character

One specimen at a time of size 120 mm. x 30 mm. x 10 mm. is fixed with the 120 mm. edge at an angle of 45° to the horizontal and the 30 mm. edge horizontal.

The samples are ignited for 5 seconds at the lower end by means of a fishtail burner. The following values are found:

EXAMPLE 11

A cotton fabric which has already received a flameproof finish is coated by the "release" process with the following polyurethane preparations:

| Constituents | Preparation number | | | | | | | |
|---|---|---|---|---|---|---|---|---|
| | 0 | 1 | 2 | 3 | 4 | 5 | 6 | 7 |
| Product of the formula: | | | | | | | | |
| (7) | | 5 | | | | | | |
| (8) | | | 5 | | | | | |
| (9) | | | | 5 | | | | |
| (10) | | | | | 5 | | | |
| (11) | | | | | | 5 | | |
| (12) | | | | | | | 5 | |
| (13) | | | | | | | | 5 |
| Dimethylformamide/methyl ethyl ketone, 1:1 ml | 8 | 8 | 8 | 8 | 8 | 8 | 8 | 8 |
| Thermoplastic polyester-polyurethane resin (30% strength solution in DMF/MEK, 1:1) | 50 | 50 | 50 | 50 | 50 | 50 | 50 | 50 |

The coated fabric weighs 490 g./m.²

After drying, the coating is tested for its flameproof character according to DIN 53,906. The ignition time is 10 seconds and the samples are 15 cm. long.

| Preparation No. 1 | Time for which burning continues afterwards, in seconds | Tear length, in cm. |
|---|---|---|
| 0 | Burns | Burns |
| 1 | 0 | 9.5 |
| 2 | 0 | 10.0 |
| 3 | 5 | 12.0 |
| 4 | 9 | 13.0 |
| 5 | 0 | 10.0 |
| 6 | 0 | 10.0 |
| 7 | 0 | 9.0 |

What is claimed is:
1. Phosphonocarboxylic acid amides of the formula

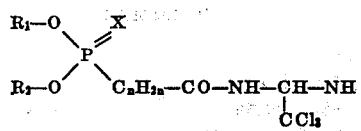

wherein X is oxygen or sulphur, $R_1$ and $R_2$ each denote alkyl, chloroalkyl or alkenyl with at most 4 carbon atoms, $A_1$ denotes phenyl or phenyl substituted by methyl, ethyl or chlorine or denotes alkyl or chloroalkyl with at most 4 carbon atoms, $A_2$ denotes phenylene or diphenylmethane, $m$ denotes 1 or 2 and $n$ denotes an integer having a value of 1 to 3.

2. Phosphonocarboxylic acid amides according to claim 1, of the formula

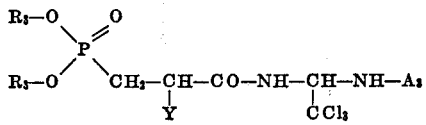

wherein $R_3$ denotes methyl or ethyl chloroethyl or allyl, $A_3$ denotes phenyl or phenyl substituted by chlorine or methyl or $A_3$ is alkyl or chloroalkyl with at most 4 carbon atoms and Y denotes hydrogen or methyl.

3. Phosphonocarboxylic acid amides according to claim 2, of the formula

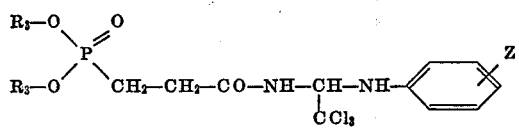

wherein $R_3$ is methyl, ethyl, chloroethyl or allyl and Z denotes hydrogen chlorine or methyl.

4. The phosphonopropionic acid amide according to claim 3, of the formula

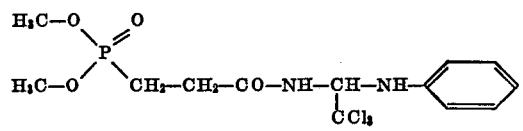

5. The phosphonopropionic acid amide according to claim 3, of the formula

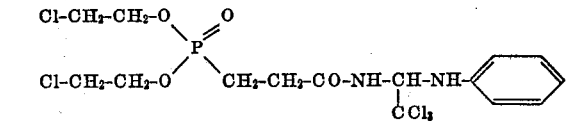

6. The phosphonopropionic acid amide according to claim 3, of the formula

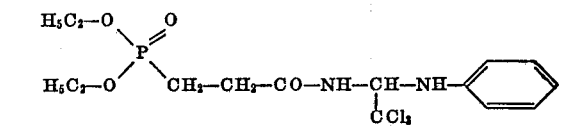

7. The phosphonopropionic acid amide according to claim 2 of the formula

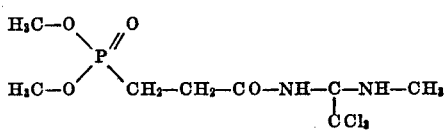

References Cited

UNITED STATES PATENTS

| | | | |
|---|---|---|---|
| 2,875,232 | 2/1959 | McConnell et al. | 260—943 X |
| 3,259,540 | 7/1966 | Pianka et al. | 260—943 X |

OTHER REFERENCES

Doerken, Chemical Abstracts, vol. 62 (1965) pp. 3943–4.

LEWIS GOTTS, Primary Examiner

R. L. RAYMOND, Assistant Examiner

U.S. Cl. X.R.

260—2.5 AJ, 932, 968